(12) United States Patent
Buddepalli et al.

(10) Patent No.: US 10,135,860 B2
(45) Date of Patent: *Nov. 20, 2018

(54) SECURITY AWARE EMAIL SERVER

(71) Applicant: International Business Machines Corporation, Armonk, NY (US)

(72) Inventors: Giridhar E. Buddepalli, Bangalore (IN); Anita Govindjee, Ithaca, NY (US); Jenny S. Li, Danbury, CT (US); Narayana Pattipati, Karnataka (IN); Lisa M. Salecedo Eichorn, Weston, FL (US); Ronald A. Soltis, Woodbury, CT (US); Nina E. Wilner, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/840,106

(22) Filed: Aug. 31, 2015

(65) Prior Publication Data

US 2017/0063919 A1 Mar. 2, 2017

(51) Int. Cl.
*G06F 15/173* (2006.01)
*H04L 29/06* (2006.01)
*H04L 12/58* (2006.01)

(52) U.S. Cl.
CPC .......... *H04L 63/145* (2013.01); *H04L 51/12* (2013.01); *H04L 51/14* (2013.01); *H04L 63/105* (2013.01); *H04L 63/1416* (2013.01); *H04L 63/1441* (2013.01)

(58) Field of Classification Search
CPC .......................... H04L 63/1441; H04L 51/12
See application file for complete search history.

(56) References Cited

U.S. PATENT DOCUMENTS

| | | | | |
|---|---|---|---|---|
| 8,959,157 B2* | 2/2015 | Walter | ................. | H04L 51/12 709/206 |
| 9,241,355 B2* | 1/2016 | Schulert | ........... | H04N 21/41407 |
| 9,560,010 B1* | 1/2017 | Estes | .................. | H04L 63/0209 |
| 9,692,780 B2* | 6/2017 | Istomin | ............... | H04L 63/1441 |
| 2004/0177120 A1* | 9/2004 | Kirsch | .................... | H04L 29/06 709/206 |
| 2005/0114672 A1* | 5/2005 | Duncan | .................. | G06F 21/10 713/182 |

(Continued)

FOREIGN PATENT DOCUMENTS

EP 1696626 A1 8/2006

OTHER PUBLICATIONS

List of IBM Patents or Patent Applications Treated as Related; (Appendix P), Filed Aug. 31, 2016; 2 pages.

(Continued)

*Primary Examiner* — Khoi V Le
(74) *Attorney, Agent, or Firm* — Cantor Colburn LLP; William A. Kinnaman, Jr.

(57) ABSTRACT

A security aware email server and a method of managing incoming email are described. The server includes a memory device configured to store rules, instructions, and user preferences. The processor makes a determination of whether a sender of an incoming email used a secure or unsecure sending network to send the email and determines an action to take with the email based on the determination and the user preferences.

16 Claims, 4 Drawing Sheets

(56) References Cited

U.S. PATENT DOCUMENTS

| | | | | |
|---|---|---|---|---|
| 2008/0244070 | A1* | 10/2008 | Kita | G06Q 10/00 709/225 |
| 2008/0282079 | A1* | 11/2008 | Yaghmour | H04L 9/00 713/150 |
| 2009/0077631 | A1* | 3/2009 | Keohane | H04L 63/0876 726/3 |
| 2009/0106825 | A1* | 4/2009 | Cerruti | G06F 21/31 726/5 |
| 2012/0084838 | A1* | 4/2012 | Inforzato | G06F 21/575 726/4 |
| 2012/0166558 | A1* | 6/2012 | Kim | H04L 51/34 709/206 |
| 2013/0091042 | A1 | 4/2013 | Shah et al. | |
| 2013/0312075 | A1* | 11/2013 | Nichols | G06F 21/41 726/8 |
| 2014/0020047 | A1* | 1/2014 | Liebmann | H04L 63/20 726/1 |
| 2014/0289816 | A1* | 9/2014 | Mazzaferri | G06F 21/6218 726/4 |
| 2014/0310772 | A1 | 10/2014 | Marshall et al. | |
| 2015/0139045 | A1* | 5/2015 | Boyle | H04M 3/58 370/271 |
| 2015/0350148 | A1* | 12/2015 | Kenney | H04L 51/24 709/206 |

OTHER PUBLICATIONS

Giridhar E. Buddepalli et al., "Security Aware Email Server", U.S. Appl. No. 15/252,656, filed Aug. 31, 2016.

List of IBM Patents or Patent Applications Treated as Related; (Appendix P), Filed Mar. 4, 2016; 2 pages.

Giridhar E. Buddepalli et al., "Security Aware Email Server", U.S. Appl. No. 15/061,109, filed Mar. 4, 2016.

\* cited by examiner

SECURITY AWARE EMAIL SERVER

BACKGROUND

The present invention relates to electronic mail (email), and more specifically, to a security aware email server.

Email is increasingly used for both personal and professional communication. With the increased use of mobile devices for sending and receiving email, emails may be sent from almost anywhere and may be received almost anywhere. While they increase the convenience in using email as a form of communication, mobile platforms may also raise security concerns. This is because a sender of email may not have used a home computer with a password-protected network, for example, or a secure enterprise network at the office. Instead, the email sender may have been connected to the intern& through a public wireless network (e.g., WiFi) at a coffee shop, airport, or other location.

SUMMARY

According to one embodiment of the present invention, a security aware email server includes a memory device configured to store rules, instructions, and user preferences; and a processor configured to make a determination of whether a sender of an incoming email used a secure or unsecure sending network to send the email and to determine an action to take with the email based on the determination and the user preferences.

According to another embodiment, a non-transitory computer program product stores instructions which, when processed by a processor, cause the processor to implement a method of managing incoming email at an email server. The method includes receiving the email with information appended thereto, the information including an indication of a location of a sender of the email and security status of a network used to send the email; determining whether the sending network is secure or unsecure; and determining an action to take with the email based on the determining whether the sending network is secure or unsecure and on user preferences.

According to yet another embodiment, a method of managing incoming email at an email server includes receiving the email with information appended thereto, the information including an indication of a location of a sender of the email and security status of a sending network used to send the email; determining, using a processor, whether the sending network is secure or unsecure; and determining, using the processor, an action to take with the email based on the determining whether the sending network is secure or unsecure and on user preferences.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, the use of mobile platforms (e.g., tablets, smart phones, laptop computers) and wide availability of publicly accessible networks has resulted in many emails being sent from unsecure networks. The location of an email sender is not necessarily dispositive in determining security of the network. That is, a user at a coffee shop may use a password-protected mobile hotspot or a personal cellular network to send emails or may use the public unsecure network to send emails. The sender's email server may append information to the email that facilitates determination by the recipient email server of whether the email was sent from a secure or unsecure network. When an unsecure network is used to send email, the email may be embedded with malware in attachments and other forms. Embodiments of the systems and methods detailed herein relate to various actions that the receiving email server may take to protect the email recipient based on a determination of the type of network used to send the email.

Figure 1:
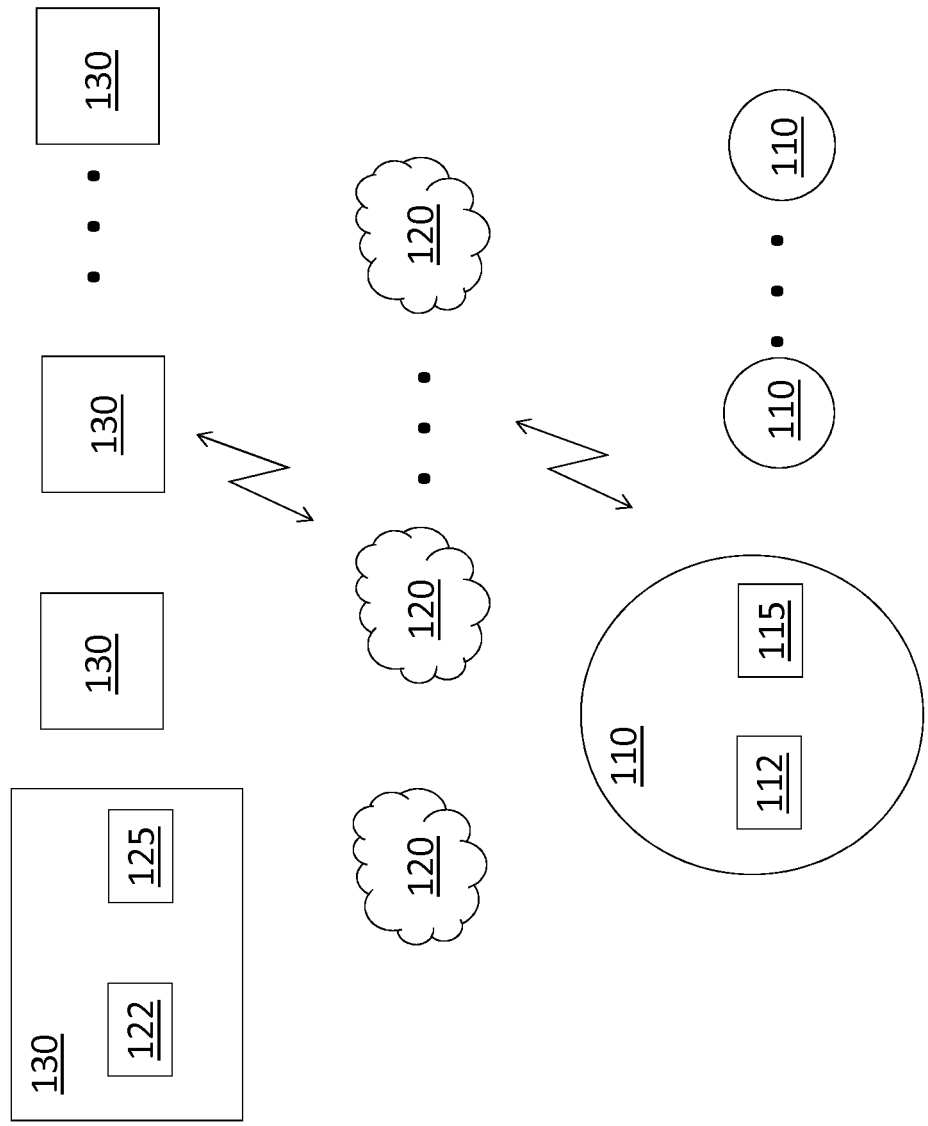
FIG. 1 is a block diagram illustrating an email system according to embodiments.

FIG. 1 is a block diagram illustrating an email system according to embodiments detailed below. Any number of users using devices 110 may be both senders and recipients of email. As noted above, each device 110 may be a computer, laptop, tablet, smartphone, or other computing device that facilitates network communication. Each device 110 includes one or more memory devices 112, one or more processors 115, and other components known to facilitate the processing and communication of information. Each user device 110 accesses an email server 130 in order to send or to receive the email. The server 130 may manage other information in addition to email or may be a dedicated email server. Each server 130 also includes one or more memory devices 122 and one or more processors 125 among other components that facilitate the processing and communication discussed below according to various embodiments. The memory device 122 may store default rules as well as the user preferences discussed below. The processor 125 determines one or more of the actions to take with a received email that are detailed below. The device 110 connects to the server 130 via a network 120. The network 120 used by a given device 110 to access the email server 120 may be secure or unsecure. Any device 110 may send or receive email, any network 120 may be used to connect to a server 120 for the purpose of sending or receiving email, and any server 120 may be a sending or receiving server. Further, in reality, the same server 130 may manage both sending and receiving of the same email to the same or different devices 110. However, for explanatory purposes, when discussing a given email, the labels "sending" or "receiving" may be added to a device 110, network 120, and server 130 (e.g., sending device 110, receiving server 130) herein.

Figure 2:
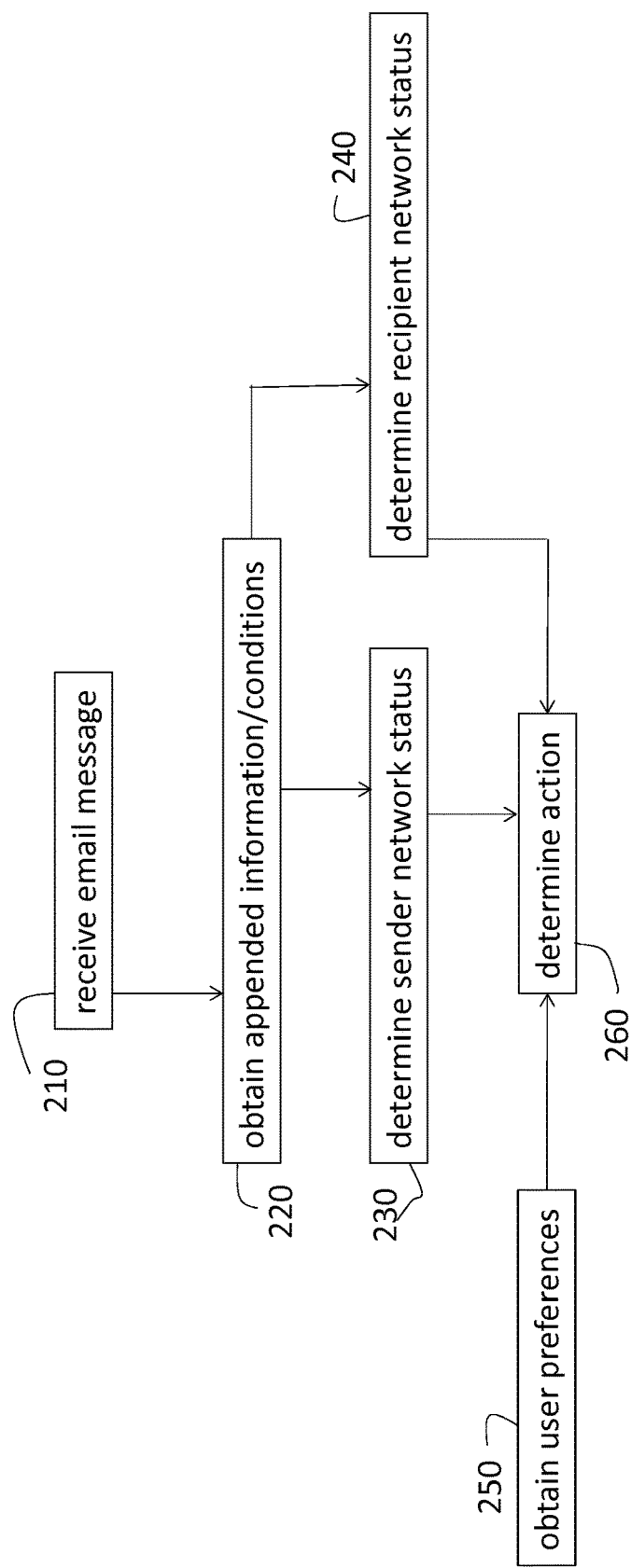
FIG. 2 is a process flow of a general method of managing incoming mail at a receiving server according to embodiments.

FIG. 2 is a process flow of a general method of managing incoming mail at a receiving server 130 according to embodiments further detailed below. As noted above with reference to FIG. 1, a sender or recipient of email uses a computing device 110 (e.g., computer, laptop, smart phone, tablet) that is connected (e.g., wirelessly, via Ethernet) through a network 120 to an email server 130 that manages that message. The network connection that the sending or receiving device 110 has with the server 130 may be secure (e.g., a personal, password-protected connection) or unsecured (e.g., public WiFi). The server 130 used by the email sending device 110 and receiving device 110 may be the same or each may have a different network connection to the server 130. At block 210, receiving an email message is from a sender's server 130 at the recipient's email server 130. As noted above, the sender and recipient servers 130 may be the same one. At block 220, obtaining appended information and, optionally, conditions at the receiving server 130 includes obtaining information that indicates the security level of the network 120 used to connect the sender device 110 to the sending server 130. The information may include not only the location of the email sender (sending device 110) but also the security features of the sender's network 120 or location information of the sending device 110 that helps to determine if the sending server 130 is secure or not, for example. When conditions are included with the email, these conditions may indicate when the receiving server 130 can release the email to the recipient's device 110. That is, the sender of the email may specify conditions required for the receiving server 130 or receiving device 110. For example, the sender of the email may specify that the recipient may not open the email using a public unsecured network 120. At block 230, determining sender network 120 status includes using the appended information to determine if the email was sent via a secure or unsecure network 120. At block 240, determining the recipient network 120 status is an optional process performed according to any conditions included with the received email. The receiving server 130 determines whether the recipient is part of a secure or unsecure network 120. At block 250, obtaining user preferences is used in conjunction with other information in determining action(s) to be taken by the receiving server 130 at block 260. The user preferences may include locations or networks 120 that the recipient wishes to designate as secure or unsecure. These preferences may override the determination at block 230 in some situations or may cause the receiving server 130 to ask the recipient regarding an override. Specific embodiments and additional details are provided below.

Figure 3:
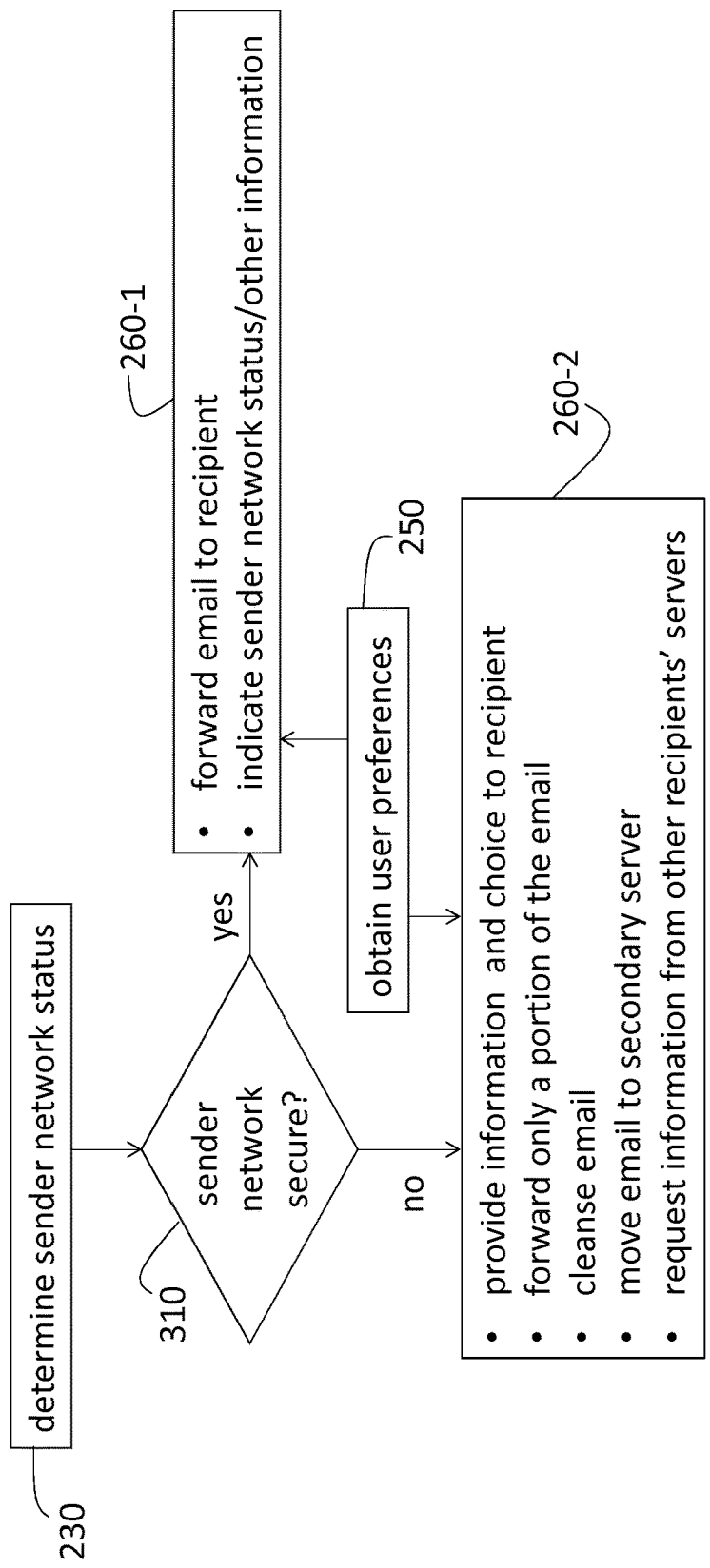
FIG. 3 details processes shown in FIG. 2 according to embodiments.

FIG. 3 details processes shown in FIG. 2 according to embodiments. After determining the sender network 120 status at block 230 (based on obtaining appended information at block 220 (FIG. 2)), a check is done of whether the sender network 120 is secure or not at 310. In addition to the answer to block 310, user preferences are also used based on obtaining user preferences at block 250. Determining the action(s) 260 of the receiving server 130 includes determining among two sets of actions 260-1 and 260-2 based on the status of the sender network 120, as shown in FIG. 3. When the sender's network 120 is secure (i.e., the sending device 110 used a secure network 120 to connect to the sending server 130), determining the action(s) 260-1 includes forwarding the email to the recipient device 110, indicating the sender network 120 status or other information to the email recipient device 110, or a combination of the two. Other information provided to the email recipient may include the location of the email sender, for example. Whether and which information is included along with the email itself as part of the actions 260-1 may be based on defaults set in the receiving server 130 or on user preferences (obtained at block 250). Both the receiving server 130 and user preferences may address the same action (e.g., whether to indicate the sender's network 120 status). In this case, the user preferences may overrule default options in the receiving server 130. In alternate embodiments, rules may be established in the servers as to which default options may be overruled by user preferences.

When the sender network 120 is unsecure, determining the actions 260-2 includes performing one or a combination of the actions shown in FIG. 3 and discussed herein. User preferences (determined at block 250) play a part in determining which actions are performed. The receiving device 110 may be provided with information (e.g., sender network 120 status, sender location) and then given a choice as to whether to retrieve the email from the receiving server 130 or not. The user preferences may specify not only whether the choice is to be given by the receiving server 130 but also which information to provide. Alternately or additionally, based on the content of the email (e.g., text, hypertext markup language (HTML) elements, attachments), only a portion of the email may be forwarded to the recipient's device 110 when the sender network 120 is determined to be unsecure. For example, only text may be forwarded from the receiving server 130 to the receiving device 110. This option may be combined with the previous option according to user preferences. That is, for example, the receiving server 130 may release only text and, additionally, may send an inquiry to the recipient (receiving device 110) as to whether the remaining content should be released or not.

As yet another alternative, the email may be cleansed by the receiving server 130. Thus, the receiving server 130 may perform a search for malware, viruses, and uniform resource locator (URL) links created with the scripting language php and address any identified issues by known techniques before sending the email to the recipient. Again, user preferences may dictate not only this process being performed but also any additional information provided to the user along with the cleansed email. In yet another embodiment, the receiving server 130 may segregate the email received from a sending device 110 that used an unsecure network 120 in a secondary server. This action by the receiving server 130, based on server settings, may be combined with other options noted above. That is, once the receiving server 130 has segregated the email received by a sender using an unsecure network 120, the receiving server 130 may then provide information and a choice of whether to open the email to the recipient or may cleanse the email, or forward only a portion of the email. Segregating the email facilitates protecting the receiving server 130. If the user chooses to open the email and consequently releases a virus or other malware, the receiving server 130 and other devices 110 connected to the server 130 may be unaffected while the issue is dealt with in the segregated server 130. Yet another action the receiving server 130 (alone or based on user preferences) may determine to take is requesting information from other recipients' servers 130. That is, when the receiving server 130 determines (at block 230) that email was received from a device 110 using an unsecure network 120, the receiving server 130 may transmit an inquiry to other servers 130 associated with other recipients of the same email. It should be understood that all recipients of a given email may be accessing the same server 130. In this case, the disposition of the email is known to the server 130. When at least one other recipient of the email is accessing a different server 130, the receiving server 130 may request information to help assess whether the email may safely be opened. The information may include the result of any cleansing process performed by the other server 130 or the result of a user device 110 opening the email through the other server 130, for example. The receiving server 130 may forward this information to the receiving device 110.

Figure 4:
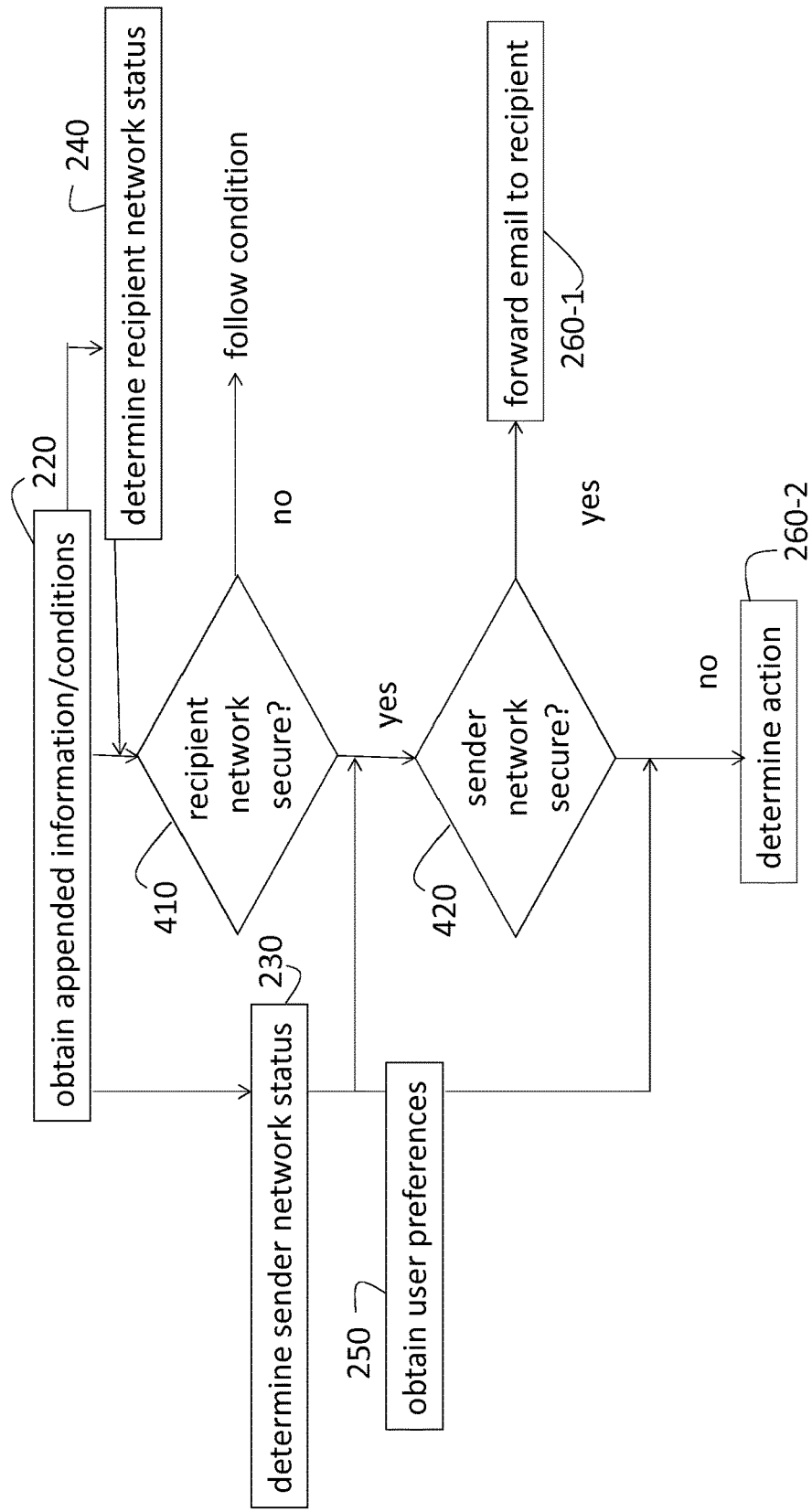
FIG. 4 details processes shown in FIG. 2 according to another embodiment.

FIG. 4 details processes shown in FIG. 2 according to another embodiment. FIG. 4 details the processes relating to a condition included with information from the sending server 130. As noted above, the condition may dictate that the recipient may not open the email unless connected to the receiving server 130 through a secure network 120, for example. When such a condition is received (at block 220), the receiving server 130 determines whether the recipient network 120 status (the network 120 connecting the receiving device 110 to itself) is secure (at block 240). At 410, a check is performed of whether the recipient network 120 is secure. When the receiving network 120 is not secure, the condition received from the sender may be followed. For example, the condition may dictate that the email be held and processed again after the recipient has changed the network 120 being used to access the receiving server 130 (e.g., recipient moves from public WiFi to home network). When the receiving network 120 is secure, then the recipients preferences (obtained at block 250) are considered based on a determination of the sender's network 120 status (at block 230) using the information received (at block 220). That is, the receiving server 130 may not forward an email even when, according to the condition from the sender, the receiving network 120 is secure. Instead, when a check (at 420) indicates that the sending network 120 is not secure, then the receiving server 130 rules and user preferences may dictate whether the email is partially sent, cleansed, reported with an option to open, or any other option available (at block 260-2) per the discussion with reference to FIG. 3. When a check (at 420) indicates that the sending network 120 is secure (and the sender's condition has been determined to be met per 410), then the email may be forwarded to the receiving device 110 and may include additional information as discussed with reference to FIG. 3 (block 260-1).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A security aware email server, comprising:
   a memory device configured to store rules, instructions, and user preferences; and
   a processor configured to make a determination of whether a sender of an incoming email used a secure or unsecure sending network to send the email and to determine an action to take with the email based on the determination and the user preferences, wherein the action includes forwarding the email to a recipient of the email, providing information to the recipient of the email, forwarding only a portion of the email to a recipient of the email, cleansing the email, moving the email to a segregated secondary server, or requesting information, the secure network requires a password-protected connection and the unsecure network is a public network and does not require the password-protected connection, and based on the email including a condition that a recipient of the email must use a secure receiving network to read the email, the processor determines whether the receiving network is secure or unsecure and forwards the email to the recipient only when the receiving network is secure.

2. The server according to claim 1, wherein the processor makes the determination based on information appended to the email.

3. The server according to claim 1, wherein, when the determination is that the sender used the secure sending network, the processor forwards the email to a recipient and also sends an indication that the sending network is secure.

4. The server according to claim 1, wherein, when the determination is that the sender used the unsecure sending network, the processor provides information to a recipient of the email and provides a choice of whether or not to receive the email.

5. The server according to claim 1, wherein, when the determination is that the sender used the unsecure sending network, the processor provides only a portion of the email to a recipient of the email.

6. The server according to claim 1, wherein, when the determination is that the sender used the unsecure sending network, the processor cleanses the email prior to forwarding to a recipient of the email.

7. The server according to claim 1, wherein, when the determination is that the sender used the unsecure sending network, the processor segregates the email in a separate server prior to forwarding information or the email to a recipient of the email.

8. The server according to claim 1, wherein, when the determination is that the sender used the unsecure sending network, the processor requests information about the email from servers associated with other recipients of the email.

9. A non-transitory computer program product storing instructions which, when processed by a processor, cause the processor to implement a method of managing incoming email at an email server, the method comprising:
- receiving the email with information appended thereto, the information including an indication of a location of a sender of the email and security status of a network used to send the email;
- determining whether the sending network is secure or unsecure, wherein the secure network requires a password-protected connection and the unsecure network is a public network and does not require the password-protected connection; and
- determining an action to take with the email based on the determining whether the sending network is secure or unsecure and on user preferences, wherein the action includes forwarding the email to a recipient of the email, providing information to the recipient of the email, forwarding only a portion of the email to a recipient of the email, cleansing the email, moving the email to a segregated secondary server, or requesting server information;
- determining whether the receiving network is secure or unsecure and forwarding the email to the recipient only when the receiving network is secure based on the information including a condition that the recipient of the email must use the secure receiving network to read the email.

10. A method of managing incoming email at an email server, the method comprising:
- receiving the email with information appended thereto, the information including an indication of a location of a sender of the email and security status of a sending network used to send the email;
- determining, using a processor, whether the sending network is secure or unsecure, wherein the secure network requires a password-protected connection and the unsecure network is a public network and does not require the password-protected connection; and
- determining, using the processor, an action to take with the email based on the determining whether the sending network is secure or unsecure and on user preferences, wherein the action includes forwarding the email to a recipient of the email, providing information to the recipient of the email, forwarding only a portion of the email to a recipient of the email, cleansing the email, moving the email to a segregated secondary server, or requesting information; and
- determining whether the receiving network is secure or unsecure and forwarding the email to the recipient only when the receiving network is secure based on the information with the email including a condition that a recipient of the email must use a secure receiving network to read the email.

11. The method according to claim 10, wherein, when the determining whether the sending network is secure or unsecure results in determining that the sending network is secure, the determining the action includes the forwarding the email to the recipient of the email and also sending an indication that the sending network is secure.

12. The method according to claim 10, wherein, when the determining whether the sending network is secure or unsecure results in determining that the sending network is unsecure, the determining the action includes the providing information to the recipient of the email and providing a choice of whether or not to receive the email.

13. The method according to claim 10, wherein, when the determining whether the sending network is secure or unsecure results in determining that the sending network is unsecure, the determining the action includes the forwarding only the portion of the email to the recipient of the email.

14. The method according to claim 10, wherein, when the determining whether the sending network is secure or unsecure results in determining that the sending network is unsecure, the determining the action includes the cleansing the email based on searching for malware, viruses, and uniform resource locator (URL) links created with the scripting language php.

15. The method according to claim 10, wherein, when the determining whether the sending network is secure or unsecure results in determining that the sending network is unsecure, the determining the action includes the moving the email to the segregated secondary server.

16. The method according to claim 10, wherein, when the determining whether the sending network is secure or unsecure results in determining that the sending network is unsecure, the determining the action includes the requesting the server information from servers associated with other recipients of the email.

* * * * *